April 24, 1945.  C. N. EOFF  2,374,274
PARACHUTE PACK FRAME AND THE LIKE
Filed June 8, 1942  2 Sheets-Sheet 1
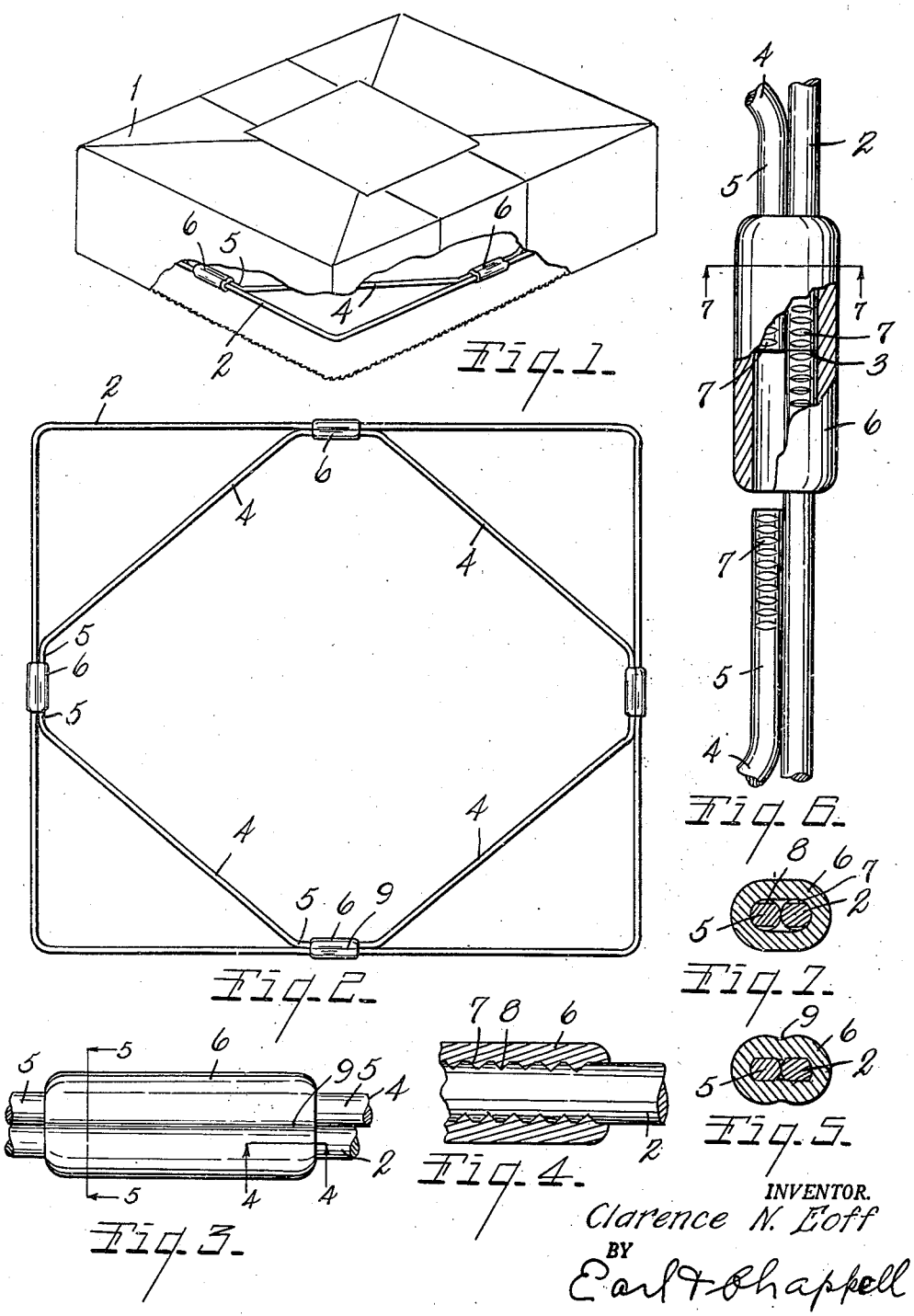
INVENTOR.
Clarence N. Eoff
BY
Earl F. Chappell

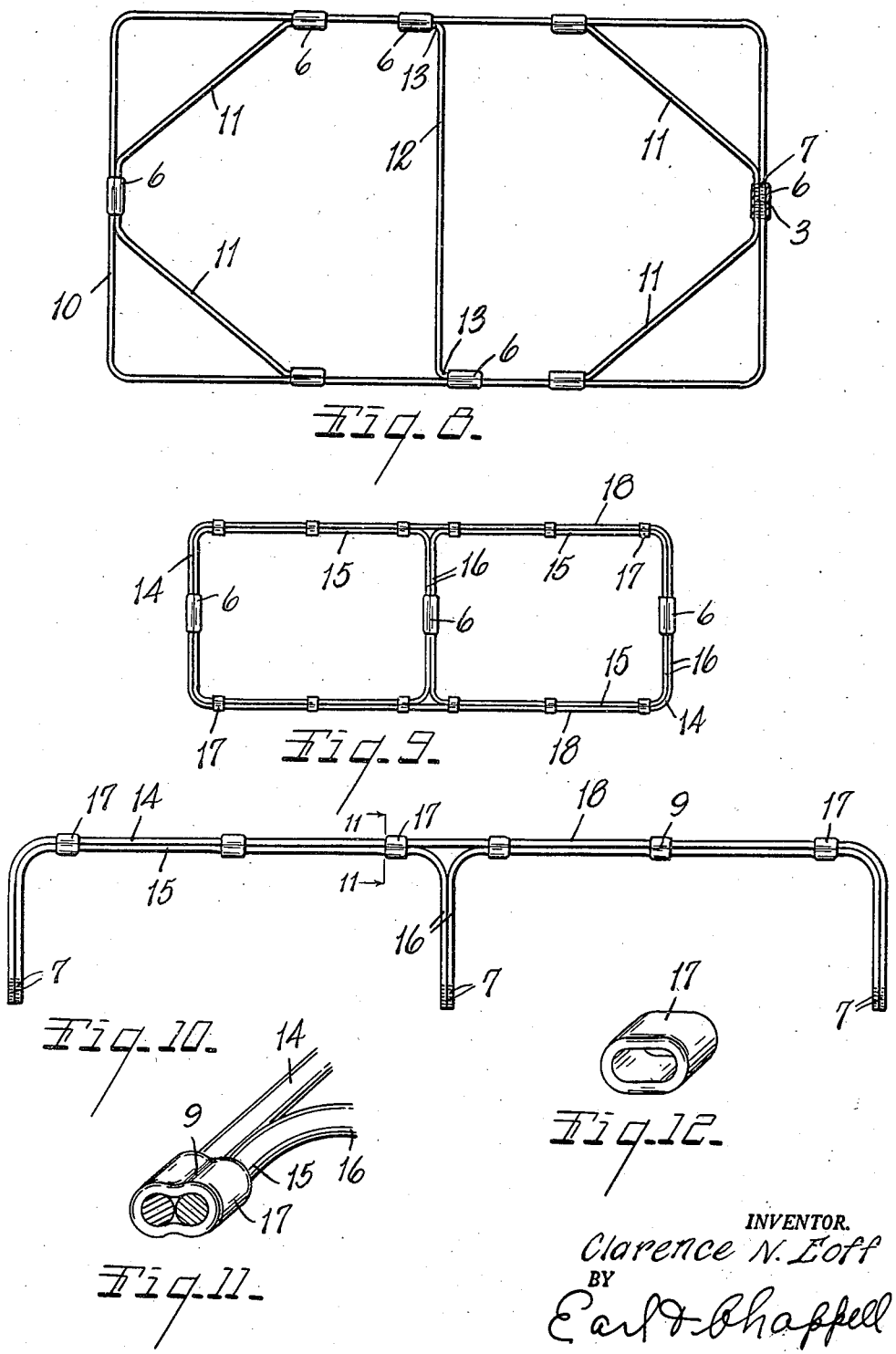

Patented Apr. 24, 1945

2,374,274

UNITED STATES PATENT OFFICE 2,374,274

PARACHUTE PACK FRAME AND THE LIKE

Clarence N. Eoff, Detroit, Mich., assignor to L. A. Young Spring and Wire Corporation, Detroit, Mich., a corporation of Michigan Application June 8, 1942, Serial No. 446,215

2 Claims. (Cl. 244—148)

This invention relates to improvements in parachute pack frames and the like.

The main objects of this invention are:

First, to provide a parachute pack frame which may be formed of quite light stock, at the same time one which is very rigid and capable of withstanding severe usage without danger of the joints becoming weakened or loosened.

Second, to provide a structure having these advantages which is quite economical to produce and obviates the necessity of using solder.

Objects relating to details and economies of the invention will appear from the description to follow. The invention is defined and pointed out in the claims.

Preferred embodiments of the invention are illustrated in the accompanying drawings, in which:

Fig. 1 is a fragmentary perspective view of a parachute pack having one of the frames of my invention embodied therein, the pack being conventionally illustrated.

Fig. 2 is a plan view of a simple and preferred form or embodiment of my invention.

Fig. 3 is an enlarged fragmentary plan view.

Fig. 4 is an enlarged fragmentary view partially in longitudinal section on line 4—4 of Fig. 3.

Fig. 5 is a transverse section on line 5—5 of Fig. 3.

Fig. 6 is a fragmentary view partially broken away and partially in longitudinal section illustrating the structure and manner of assembling the parts of the structure.

Fig. 7 is a transverse section on line 7—7 of Fig. 6.

Fig. 8 is a plan view partially in section of a modified form or embodiment of my invention.

Fig. 9 is a plan view of another form or embodiment of my invention.

Fig. 10 is an enlarged plan view of one section or part of the embodiment of my invention shown in Fig. 9.

Fig. 11 is an enlarged fragmentary perspective view in section on line 11—11 of Fig. 10.

Fig. 12 is a perspective view of one form of coupling member of sleeve used in the embodiment of my invention shown in Figs. 9 and 10.

In the accompanying drawings, 1 represents a parachute pack and it will be understood that I have merely attempted to show the use of the frame of my invention.

Referring to Fig. 2, the embodiment of the invention there illustrated comprises a border member 2 formed of heavy wire or light rod stock of round section. This is formed so as to be in effect endless, being preferably of one piece with the ends brought together in abutting relation as shown at 3 in Fig. 6. In this embodiment, I provide four diagonally disposed braces 4 of a stock of the same section as the border member and having end portions 5 disposed in parallel relation to the sides of the border member. The terminals 5 of these braces are preferably disposed to abut.

The tubular unsplit coupling members 6 have walls of substantial thickness and are of oval section so as to receive the border member and the brace members in side by side relation as illustrated. They are of substantial length so as to embrace substantial portions of the border and brace members. The border and brace members have transverse serrations 7 on corresponding sides thereof and preferably a number of such serrations or a number of transverse notches arranged in series.

The bottoms 8 of these serrations or notches provide flattened portions so that when the coupling members are clamped down upon the portions of the border frame and braces embraced thereby and embedded in the serrations or notches, the coupling members not only serve to prevent the parts pulling apart longitudinally but they serve to prevent twisting movement of the braces or reinforcing members relative to the border frame.

In the embodiment shown in Fig. 2, there are four diagonal braces. They serve to effectively support the sides of the border frame and also to prevent wracking or collapsing movement. Of course, when the parts are secured together as described, they become in effect one solid frame. The coupling members are longitudinally indented at 9 to provide further clamping engagement upon the connected parts.

Heretofore, so far as applicant is aware, it has been the common practice to solder the frame and brace parts together in structures of this class. The joints under the severe usage to which they are subjected are likely to open up which not only renders the structure useless but it may become dangerous. It is required that the structure shall be very strong and at the same time it is desirable that it be made of as light stock as possible not only in the matter of economy of materials but also in reducing weight. My invention enables the making of structures having both these features and also the very rapid production without the necessity of soldering and the attendant uncertainties.

In the embodiment of my invention shown in Fig. 8, the frame designated by the numeral 10 is substantially elongated. The braces 11 of this structure are secured as has been described but I provide a cross brace 12 having laterally turned terminals 13 which are secured by means of coupling members 6 as has been described.

In the embodiment shown in Figs. 9, 10 and 11, the border frame 14 is substantially elongated and rectangular bracing or reinforcing members 15 are provided, there being a pair of these members, the inner reaches 16 of which are disposed side by side and secured together by coupling members 6. The other reaches of these reinforcing members are disposed on the inside of the border frame and secured thereto by clips 17.

For convenience in manufacture, the structure shown in Fig. 9 is formed of two units designated by the numeral 18 and these are brought together and secured by the coupling member 6, both the border members and the reinforcing members being provided with the transverse serrations or notches into which the coupling members are embedded as described in connection with the embodiment shown in Figs. 1 to 7 inclusive.

I have illustrated and described my invention in embodiments thereof which have been found satisfactory. It is believed that the disclosures made will enable those skilled in the art to embody or adapt my invention as may be desired.

Having thus described my invention, what I claim as new and desire to secure by Letters Patent, is:

1. A parachute pack frame comprising a rectangular border member of wire or rod stock of round section, diagonally disposed braces of stock of the same section as the border member having end portions disposed on the inner sides of and in parallel relation to the side members of the border member with their ends in abutting relation, and tubular coupling members oblong in cross section and closely embracing the side members of the border member and the end portions of said braces, the plane of the oblong tubular coupling members being substantially parallel to the plane of the rectangular border member, said tubular coupling members being of sheet-like form and unsplit both longitudinally and transversely of the length thereof, portions of the said border member and the said braces embraced by said coupling members having transverse serrations of substantial depth on the sides thereof as are substantially parallel to the plane of the rectangular border member, said coupling members being clamped upon said serrated portions of said border member and clamped upon the serrated abutting end portions of said brace members embraced thereby and embedded into said serrations to prevent relative longitudinal and twisting displacement of said border member and brace members.

2. A parachute pack frame comprising a rectangular border member of metal, diagonally disposed metal braces having end portions disposed in alinement with each other and on the inner sides of and in parallel relation to the side members of the border member, and tubular coupling members oblong in cross section and closely embracing the side members of the border member and the end portions of said braces, the plane of the oblong tubular coupling members being substantially parallel to the plane of the rectangular border member, said tubular coupling members being of sheet-like form and unsplit both longitudinally and transversely of the length thereof, portions of the said border members and the said braces embraced by said coupling members having transverse notches of substantial depth on the sides thereof as are substantially parallel to the plane of the rectangular border member, said coupling members being clamped upon said notched portions of said border member and clamped upon the alinement notched end portions of said brace members embraced thereby and embedded into said notches, the opposed sides of said coupling members being longitudinally indented between the border member and the brace members.

CLARENCE N. EOFF.